United States Patent Office 3,658,774
Patented Apr. 25, 1972

3,658,774
REDUCING CATALYST PRECIPITATION DURING POLYMER ISOLATION
Andrew Tze-Chiu Liu, Beaumont, Tex., assignor to E. I. du Pont de Nemours and Company, Wilmington, Del.
No Drawing. Filed Nov. 17, 1969, Ser. No. 877,449
Int. Cl. C08f 15/40
U.S. Cl. 260—80.78
4 Claims

ABSTRACT OF THE DISCLOSURE

A process for preparing an elastomeric polyolefin in a solvent solution, in the presence of a coordination-type catalyst having a transition metal component, wherein the polyolefin is isolated by (a) mixing the polyolefin solution with steam or water to deactivate the catalyst, and form an aqueous phase in the polyolefin solution; (b) separating the aqueous phase from the polyolefin solution; and (c) separating the polyolefin from the solvent; the precipitation of catalyst residues is practically eliminated by adding to the mixture of the polyolefin solution and the aqueous phase 5–200 mole percent of a salt of an oxyacid of sulfur from the group of bisulfites, bisulfates, or persulfates based on the moles of transition metal component of the catalyst.

BACKGROUND OF THE INVENTION

This invention relates to a process for isolating a polyolefin from a polymerization medium and more particularly to a process for reducing the amount of polymerization catalyst residues that precipitate during the isolation.

It is well known that synthetic elastomeric polymers can be prepared by polymerizing or copolymerizing olefins and/or diolefins with a coordination catalyst in an organic solvent. After polymerization, the polymer and the polymerization medium are drawn from the reactor and the polymer is thereafter isolated from the polymerization medium. The polymerization reactor effluent is a solution or suspension of polymer and unreacted monomers in the solvent medium. The polymer in the effluent contains organometallic terminal moieties which are chemically inactivated to terminate the growth of the polymer molecule. Thereafter the unreacted monomers and metallic catalyst residues are separated from the reaction mixture and the polymer is isolated from the remaining solution.

Many processes are disclosed in the art for isolating polymers. One commercially practical process includes the steps of:

(a) Mixing the polymerization reactor effluent with steam which deactivates the catalyst, vaporizes unreacted monomers, and condenses to form an aqueous phase;

(b) Separating the aqueous phase from the polymer solution with the addition of more water, if necessary, to remove water-soluble catalyst residues;

(c) Separating the polymer from the solvent by the use of steam which can be accomplished by using the steam isolation nozzle disclosed in U.S. Pat. 3,423,038; and (d) Vaporizing any remaining solvent thereby obtaining crumb polymer.

While the isolation process disclosed above is generally satisfactory, it has been found in practice that a portion of metallic catalyst residue precipitates from the aqueous phase causing solid deposits to form in process lines and vessels. These deposits are particularly troublesome when separating the polymer from solvent in a steam isolation nozzle disclosed in U.S. Pat. 3,423,028 because the small orifices in the nozzle can become obstructed by such deposits necessitating shut down of the processes to clean the equipment. Therefore, there is a need for a process of preparing and isolating an elastomeric polyolefin while practically eliminating catalyst residue precipitates.

SUMMARY OF THE INVENTION

Accordingly, this invention provides a process for preparing and isolating an elastomer polyolefin while practically eliminating catalyst residue precipitates. The polyolefin is prepared in a solvent solution in the presence of a coordination catalyst having a transition metal component. Isolation of the polyolefin is accomplished by (a) mixing the polyolefin solution with steam or water to deactivate the catalyst and form an aqueous phase, (b) separating the aqueous phase from the polyolefin solution and (c) separating the polyolefin from the solvent. Catalyst residue precipitates are practically elminated by adding to the mixture of polyolefin solution and aqueous phase of (a) above, about 5–200 mole percent of a salt of an oxyacid of sulfur from the group of bisulfates, bisulfites or persulfates based on the moles of transition metal component of the catalyst.

DETAILS OF THE INVENTION

This invention is useful in preparing elastomeric polyolefins in the presence of a coordination-type catalyst. The polyolefin can be a homopolymer such as polybutadiene or a copolymer made by interpolymerizing two or more different monomers. Useful copolymers include those made from at least one α-monoolefin and at least one nonconjugated diene. The α-monoolefins have the structure R—CH=CH$_2$ where R is hydrogen or C$_1$–C$_{16}$ alkyl, preferably with a straight chain. Representative α-monoolefins are ethylene, propylene, 1-butene, 1-pentene, 1-hexene, 1-heptene, 1-octene, 1-octadecene, 6-ethyl-1-decene and 5-methyl-1-hexene, etc.

The nonconjugated dienes useful in this invention can be open-chain or cyclic compounds having at least one polymerizable double bond in the sense that at least one double bond of the diene reacts to a substantial degree in forming the polymer backbone of a polymer prepared by conventional polymerization procedures with a coordination catalyst. Terminal double bonds and the endocyclic double bond at the 2-position in unsaturated derivatives of 2-norbornene are typical of such polymerizable double bonds. The open-chain nonconjugated dienes correspond to the formula

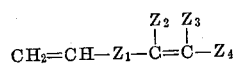

wherein Z$_1$ is C$_1$–C$_8$ alkylene and Z$_2$, Z$_3$ and Z$_4$ are independently hydrogen or an alkyl radical, with the proviso that the Z groups indicated in said formula are selected such that the diene has from about 6–22 carbon atoms. Representative dienes are 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Open-chain dienes having two terminal nonconjugated carbon-to-carbon double bonds, where Z$_2$, Z$_3$ and Z$_4$ are hydrogen, e.g., 1,5-hexadiene or 1,4-pentadiene, can be used but are much less preferred. Cyclic nonconjugated dienes include dicyclopentadiene, 5-alkenyl-substituted-2-norbornenes, e.g., 5-butenyl-2-norbornene, 5-alkylidene-2-norbornenes (including ethylidene-2-norbornenes and 5-methylene-2-norbornene), 2-alkyl-2,5-norbornadienes (e.g., 2-ethyl-2,5-norbornadiene), and 1,5-cyclooctadiene. The preferred diene is 1,4-hexadiene because of the outstanding physical properties of the copolymers prepared therefrom.

Representative copolymers made from the above-described α-monoolefins and nonconjugated dienes and methods for their preparation are given in U.S. Pats. 2,933,480; 3,000,866; 3,063,973; 3,093,620; 3,093,621; 3,151,173; 3,260,708; and Belgian Pat. 697,049. Particularly preferred because of their excellent physical properties are copolymers of from about 30 to 70 weight percent ethylene, 60 to 20 weight percent propylene, and 0.5 to about 10 weight percent 1,4-hexadiene or 5-ethylidene-2-norbornene. The copolymers contain from about 0.1–2.0 and preferably about 0.2–1.0 gram moles of ethylenic unsaturation per kilogram of copolymer.

Coordination catalysts are well known in the art. They include the reaction products of a reducible Group IV-B, V-B, or VI-B metal compound, e.g. titanium trichloride or tetrachloride, vanadium tetrachloride, vanadium oxytrichloride, in combination with a strong reducing agent such as the organometallic compounds of aluminum, e.g. aluminum trialkyls, dialkyl aluminum halides, alkyl aluminum dihalides, aluminum sesquihalides, etc., in which the halide is preferably chloride. A large variety of coordination catalysts have been disclosed in the art. In preparing an amorphous, soluble elastomeric polymer, it is well recognized that a catalyst soluble in the reaction mixture should be used, and the preferred types are generally those based on vanadium compounds such as $VCl_4$, $VOCl_3$, vanadium tris (acetylacetonate), etc., in combination with an aluminum trialkyl or one of the organo aluminum halides mentioned above.

The polymerization process is carried out in the presence of a polymer solvent. Useful solvents known to the art include the volatile inert liquids such as the lower, i.e. $C_5$–$C_{10}$, alkanes or cycloalkanes, including n-hexane and the mixture known commercially as "hexane"; halogenated lower alkanes and alkenes such as ethylidene chloride, trichloroethane, perchloroethylene, etc.; or aromatic solvents such as benzene, toluene, chlorobenzene, and the like.

After the polyolefin has been formed the catalyst is deactivated by contacting the solution with water or preferably steam. Steam serves the dual purpose of deactivating the catalyst and vaporizing the unreacted monomers. In either case an aqueous phase forms which contains catalyst residues, these usually being a mixture of salts, oxides and hydroxides of the metals used in the catalyst system. These residues are for the most part dissolved or dispersed in the aqueous phase and are removed from the polymer solution by decanting the aqueous phase. Nevertheless, a certain portion of insoluble catalyst residue frequently is formed. The residue remains in the polymer solution and can eventually foul process equipment or remain in the polymer as a deleterious material. The formation of insoluble residues is practically eliminated by adding to the mixture of the polyolefin solution and the aqueous phase, after the catalyst is deactivated, 5–200 mole percent of a salt of an oxyacid from the group of bisulfates, bisulfites or persulfates based on the moles of transition metal component; 20–50 mole percent is preferred. Useful salts include sodium bisulfite, sodium bisulfate, potassium persulfate, potassium bisulfite, potassium metabisulfite or ammonium persulfate. The salt can be conveniently added as an aqueous solution.

Thereafter, isolation of the polyolefin continues according to the methods known to the art. The aqueous phase is separated from the polyolefin solution, as for example by decanting the aqueous phase. The remaining polyolefin solution can then be fed to a steam isolation nozzle such as that disclosed in U.S. Pat. 3,423,028 wherein the polyolefin solution is mixed with steam. The polyolefin exits the nozzle containing about 50 weight percent solvent plus entrained steam and water. The nozzle effluent is fed through a stripping tube into a flash chamber for solvent and steam removal and the resultant polyolefin in the form of a swollen crumb is dried.

This invention provides the advantages of practically eliminating the precipitation of catalyst residues during the preparation and isolation of elastomeric polyolefins thereby avoiding the fouling of process equipment and the polyolefin obtained contains a low concentration of metallic catalyst residue thereby practically eliminating the deleterious effect of such residues on the thermal stability of the polymer.

This invention is illustrated by the following examples.

EXAMPLE 1

(A) A typical coordination catalyst is treated with aqueous media to determine the conditions that cause solid precipitates to form conditions that prevent the formation of precipitates and whether the aqueous phase is a colloidal suspension or a true solution.

A coordination catalyst is prepared in seven 500-ml. oxygen- and moisture-free bottles fitted with a serum cap by charging each bottle with 62 ml. of polymerization grade perchloroethylene, 1.7 ml. of 25 weight percent vanadium oxytrichloride in perchloroethylene, and 4 ml. of 25 weight percent diisobutyl aluminum chloride in perchloroethylene, at 0° C. The mixture is allowed to stand for 30 minutes to ensure complete reaction. One bottle of solution is used as the control. To the control solution are added 62 ml. of deoxygenated water. To the remaining six bottles are added 62 ml. of a 2-millimolar tap water salt solution of (1) sodium bisulfate, (2) ammonium persulfate, (3) potassium persulfate, (4) potassium bisulfate, (5) potassium metabisulfite, and (6) sodium bisulfite, respectively at 0° C. The bottles are sparged thoroughly with nitrogen to remove oxygen. After thorough mixing, the bottles are allowed to stand for 24 hours at room temperature. Visual observation shows that the control sample containing deoxygenated water contains a large amount of clearly visible solid precipitate at the interface between the aqueous and organic phases; sample (1), containing sodium bisulfate, contains no precipitate; samples (2)–(5), containing ammonium persulfate, potassium persulfate, potassium bisulfate, and potassium metabisulfite respectively, contain no precipitate and sample (6) containing sodium bisulfite, contains a very nominal amount of suspended precipitate.

It is observed by examination of these mixtures in a spectrophotometer in the 400–700 micron wavelength region that the aqueous phase of the control is a colloidal suspension (i.e., shows no absorption maxima), while the aqueous phases of the salt-containing samples are true solutions (i.e., show distinct absorption maxima). The colloidal suspension tends to coalesce to a solid precipitate which can cause problems when used in a polymerization process.

(B) A typical coordination catalyst is treated with an aqueous medium and an oxidizing agent to determine the effect of oxygen. Seven more bottles are charged according to the procedure described above. A 10-mL solution of 3% hydrogen peroxide is injected in ½ ml. increments into each bottle at equally spaced time intervals over a 30-minute period at 0° C. The color of the water layer changes from green to yellow as the vanadium is oxidized. After the samples have stood for 24 hours, they are filtered and the amount of precipitate is weighed after being dried in a vacuum oven. The results are as follows:

| Sample | Salt | Precipitate, mg. |
| --- | --- | --- |
| Control | None | 166 |
| 1 | Sodium bisulfate | 0 |
| 2 | Ammonium persulfate | 5 |
| 3 | Potassium persulfate | 10 |
| 4 | Potassium bisulfate | 38 |
| 5 | Potassium metabisulfite | 56 |
| 6 | Sodium bisulfite | 84 |

These salts clearly tend to solubilize the hydrolysis products of the coordination catalyst, even in an oxidizing medium showing that they are oxygen resistant.

EXAMPLE 2

A 5 weight percent solution of ethylene/propylene/1,4-hexadiene (56/40/4) polymer is prepared in tetrachloroethylene in the presence of a coordination-type catalyst of vanadium oxytrichloride and diisobutyl aluminum chloride in accordance with known procedures (see U.S. Pat. 2,933,480).

The polymer solution is mixed with steam in the amount of 80 lbs. of 110° C. steam per 100 lbs. of solvent with the reaction mass temperature at about 50° C. to simultaneously deactivate the catalyst and vaporize the unreacted monomers. The steam condenses forming an aqueous phase in the presence of the organic polymer solution. A 20 weight percent solution of sodium bisulfate in filtered tap water (not degassed) is metered into the mixture of the aqueous phase and organic polymer solution to provide 21 mole percent sodium bisulfate based on the moles of vanadium present. The aqueous phase is then separated from the polymer solution by decantation and the polymer solution is directed through the jet fluid mixing device (sometimes referred to as a steam isolation nozzle) disclosed in U.S. Pat. 3,423,028 wherein the polymer solution is once again mixed with steam. The average pressure drop in the steam isolation nozzle is 63 p.s.i.g., no nozzle plugging occurs and the isolated polymer contains 4.5 p.p.m. of vanadium. For comparison, if no sodium bisulfate is used, the average pressure drop across the nozzle is 100 p.s.i.g., the nozzle is frequently plugged with solid particles and the isolated polymer contains an average of 7 p.p.m. vanadium.

What I claim is:

1. In a process for preparing an elastomeric polyolefin in a solvent solution, in the presence of a coordination catalyst having a transition metal component, wherein the polymer is isolated by:

(a) mixing the polyolefin solution with steam or water to deactivate the catalyst and form an aqueous phase;

(b) separating the aqueous phase from the polyolefin solution; and (c) separating the polymer from the solvent, the improvement of adding to the mixture of polyolefin solution and aqueous phase of (a) from about 5–200 mole percent of a salt of an oxyacid of sulfur from the group of bisulfates, bisulfites or persulfates based on the moles of transition metal component of the catalyst.

2. The process of claim 1 in which the salt is sodium bisulfite, sodium bisulfate, potassium persulfate, potassium bisulfate, potassium metabisulfite or ammonium persulfate.

3. The process of claim 1 in which the salt is present in the amount of 20–50 mole percent based on the moles of transition metal component of the catalyst.

4. The process of claim 3 in which the elastomeric polymer prepared is an ethylene/propylene/1,4-hexadiene polymer, the catalyst contains vanadium and an organo aluminum compound, the solvent is a hydrocarbon solvent, and the salt is sodium bisulfate.

References Cited
UNITED STATES PATENTS

| | | | |
|---|---|---|---|
| 3,268,501 | 8/1966 | Crouch et al. | 260—94.7 |
| 3,280,082 | 10/1966 | Natta et al. | 260—80.7 |
| 3,317,496 | 5/1967 | Natta et al. | 260—88.2 |
| 3,349,064 | 10/1967 | Gumboldt et al. | 260—80.7 |
| 3,352,816 | 11/1967 | Meyer et al. | 260—45.7 |
| 3,553,186 | 1/1971 | Schnoring et al. | 260—94.7 |

JOSEPH L. SCHOFER, Primary Examiner

R. A. GAITHER, Assistant Examiner

U.S. Cl. X.R.

260—88.2 D, 88.2 E, 94.3